(12) United States Patent
Koller et al.

(10) Patent No.: US 7,960,026 B2
(45) Date of Patent: *Jun. 14, 2011

(54) ORGANIC-INORGANIC COMPOSITE PARTICLE AND PROCESS FOR PREPARATION THEREOF

(75) Inventors: Anne Denise Koller, Hatfield, PA (US); Robert Mitchell Blankenship, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/283,646

(22) Filed: Sep. 15, 2008

(65) Prior Publication Data
US 2009/0017304 A1  Jan. 15, 2009

Related U.S. Application Data

(63) Continuation of application No. 10/762,047, filed on Jan. 21, 2004, now Pat. No. 7,488,534.

(60) Provisional application No. 60/442,214, filed on Jan. 24, 2003.

(51) Int. Cl.
*B32B 5/16* (2006.01)
(52) U.S. Cl. ........ 428/403; 428/404; 428/407; 528/398; 524/126; 524/127; 524/128
(58) Field of Classification Search .................. 428/403, 428/404, 407; 528/398; 524/126–128
See application file for complete search history.

(56) References Cited

U.S. PATENT DOCUMENTS

| | | | |
|---|---|---|---|
| 3,133,893 A | 5/1964 | Newman | |
| 4,062,692 A | 12/1977 | Hemmerich et al. | |
| 4,608,401 A | 8/1986 | Martin | |
| 4,981,882 A | 1/1991 | Smith et al. | |
| RE34,145 E | 12/1992 | Martin | |
| 5,385,960 A | 1/1995 | Emmons | |
| 6,710,161 B2 | 3/2004 | Bardman et al. | 528/398 |
| 6,721,083 B2 | 4/2004 | Jacobson et al. | 359/296 |
| 6,733,884 B2 | 5/2004 | Brown | 428/404 |
| 7,488,534 B2 * | 2/2009 | Koller et al. | 428/403 |

FOREIGN PATENT DOCUMENTS

| | | |
|---|---|---|
| EP | 0 154 739 A | 9/1985 |
| EP | 1 209 191 A | 5/2002 |
| EP | 1 273 636 A | 1/2003 |
| WO | WO 0129106 | 4/2001 |
| WO | WO 03000760 | 1/2003 |

OTHER PUBLICATIONS

Erdem et al; "Encapsulation of Inorganic Particles via Miniemulsion Polymerization. I. Dispersion of Titanium Dioxide Particles in Organic Media Using OLOA 370 as Stabilizer";Journal of Polymer Science: Part A Polymer Chemistry, vol. 38, 4419; pp. 4419-4430; Sep. 19, 2000.

* cited by examiner

*Primary Examiner* — Leszek Kiliman
(74) *Attorney, Agent, or Firm* — Reid S. Willis

(57) ABSTRACT

An organic-inorganic composite particle containing an inorganic particle having a plurality of polymer particles attached to the inorganic particle and a polymer layer encapsulating the attached polymer particles. A process is provided for the organic-inorganic composite particle. The organic-inorganic composite particle is useful in the preparation of dried coatings that have improved hiding, whiteness, or gloss.

10 Claims, No Drawings

ORGANIC-INORGANIC COMPOSITE PARTICLE AND PROCESS FOR PREPARATION THEREOF

This application is a continuation of U.S. patent application Ser. No. 10/762,047 filed Jan. 21, 2004, now issued U.S. Pat. No. 7,488,534, which claims priority to U.S. Provisional Application Ser. No. 60/442,214 filed Jan. 24, 2003.

This invention generally relates to an organic-inorganic composite particle containing an inorganic particle having a plurality of polymer particles attached thereto and a polymer layer encapsulating the attached polymer particles. The invention further relates to a process for preparing the composite particle. The organic-inorganic composite particle is useful in the preparation of dried coatings that have improved hiding, whiteness, or gloss.

Inorganic particles are commonly incorporated into organic coatings as opacifying pigments to provide whiteness and opacity or "hiding", to opacifying coatings, such as paints. These pigments are present in all coatings that are designed to provide an opaque coating on and concealingly cover an undersurface or substrate surface to which the coating is applied. Opacifying pigments are absent from those coatings that are designed to be clear or transparent. Opacifying pigments are present in opacifying coatings, especially paints. In most paints, the opacifying pigment is present irrespective of whether the paint is white or colored. The opacifying pigment of most paints is distinguished from the color specific pigments, also known as tinting agents or colorants, which are additionally present in colored paints. It is the color specific pigments that provide the specific color or tint to non-white paints.

It is desirable that opacifying coatings and paints have a high opacifying capacity so as to enable the coating or paint to completely conceal the undersurface, even if of a sharply contrasting color, while utilizing a minimal application of the coating or paint. It is highly desirable that complete covering of the undersurface is attained with a single application of the coating or paint, having the minimum possible thickness.

Opacifying coating and paint manufacturers have long sought to formulate opacifying coatings and paints having the desired opacity by maximizing the level of hiding for a defined level of opacifying pigment, in order to minimize the amount of opacifying pigment utilized.

The opacifying capacity or hiding power of an opacifying coating or paint is a measure of the coating's ability to conceal a surface to which the coating is applied. Opacifying capacity is a function of the spacing between the particles of opacifying pigment in the dried applied coating. Opacifying capacity of a coating is maximized when the light scattering capability of the opacifying pigment is maximized. Maximum light scattering efficiency occurs when the opacifying pigment particles have a certain diameter and spacing, so that the light scattering capability of each particle does not interfere with the light scattering capability of its neighboring particles. This condition may occur in coatings containing sufficiently low levels of opacifying pigment such that the individual opacifying pigment particles are isolated from each other. Coatings containing such low levels of opacifying pigment, however, do not provide sufficient whiteness and hiding at typical dried coating thicknesses. Achieving the desired levels of hiding and whiteness typically requires higher levels of opacifying pigment. At these higher levels, a statistical distribution of opacifying pigment particles occurs, which results in at least some of the opacifying pigment particles being in such close proximity to one another that there is a loss of light scattering efficiency due to crowding of the opacifying pigment particles.

Increased hiding efficiency is obtained by reducing the crowding of the opacifying pigment particles and minimizing the formation of clusters of opacifying pigment particles. For example, U.S. Pat. No. Re. 34,145 discloses a stable aqueous suspension of discrete finely divided solid particles each encapsulated within an envelope of a water-insoluble addition polymer. The water-insoluble addition polymer is prepared in a system that must be substantially nonionic in the early and intermediate stage of polymerization. The reference discloses that titanium dioxide encapsulated by an envelope of water-insoluble addition polymer exhibited improved hiding power.

Although these polymer encapsulated titanium dioxide particles provide improved hiding, there is a need to provide encapsulated inorganic particles that can be prepared by processes in the presence of ionic species, such as metal anions, nonmetallic cations, and ionic surfactants. Preparing a non-ionic polymerization system on a commercial scale is difficult as ionic species are commonly found as impurities in commercial scale production equipment. The removal of ionic impurities can be difficult or add extra processing costs. Further, many common synthesis adjuvants employed in polymerization processes, such as initiators, surfactants, and buffers, introduce ionic species to the polymerization. A polymerization process for preparing polymer encapsulated inorganic particles that is not limited to nonionic polymerization conditions could allow the preparation of these particles under a wider variety of polymerization conditions or allow the preparation of polymer encapsulates inorganic particles with a wider compositional range, in particular, encapsulated inorganic particles with larger polymer shells.

The presence invention provides organic-inorganic composite particles that can be prepared in the presence of ionic species such as ionic initiators, buffers, and ionic monomers. The organic-inorganic composite particles are useful for preparing dried coatings having improved properties, such as increased hiding, increased whiteness, or increased gloss. These organic-inorganic composite particles allow the preparation of dried coatings containing lower levels of pigment, such as titanium dioxide; or are applied at lower coating weights than coatings not containing encapsulated titanium dioxide. The dried coatings containing the organic-inorganic composite particles are alternatively prepared with low levels or even in the absence of volatile organic compounds.

According to the first aspect of the present invention, an organic-inorganic composite particle is provided including a primary composite particle containing an inorganic particle and a plurality of polymer particles attached to the inorganic particle; and a polymer layer encapsulating the primary composite particle.

A second aspect of the present invention provides a process for preparing organic-inorganic composite particles, including the steps of providing an aqueous dispersion containing primary composite particles dispersed in an aqueous medium, wherein each of the primary composite particles contain an inorganic particle and a plurality of polymer particles attached to the inorganic particle; and polymerizing at least one monomer in the presence of the primary composite particles to form a polymer layer encapsulating the primary composite particles and to provide the organic-inorganic composite particles.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; and the term "(meth)acrylamide" refers to either acrylamide or methacrylamide.

"Glass transition temperature" or "$T_g$" as used herein, means the temperature at or above which a glassy polymer undergoes segmental motion of the polymer chain. Glass transition temperatures of a polymer are estimated by the Fox equation [*Bulletin of the American Physical Society* 1, 3 Page 123 (1956)], as follows:

$$\frac{1}{T_g} = \frac{w_1}{T_{g(1)}} + \frac{w_2}{T_{g(2)}}$$

For a copolymer, $w_1$ and $w_2$ are the weight fraction of the two co-monomers, and $T_{g(1)}$ and $T_{g(2)}$ are the glass transition temperatures, in Kelvin, of the two corresponding homopolymers. For polymers containing three or more monomers, additional terms ($w_n/T_{g(n)}$) are added. Alternatively, the $T_g$ of a polymer phase is calculated by using the appropriate values for the glass transition temperatures of homopolymers, which are found, for example, in "Polymer Handbook", edited by J. Brandrup and E. H. Immergut, Interscience Publishers. The values of $T_g$ reported herein are calculated based on the Fox equation.

As used herein, the term "covalent bond" refers to a bond between two atoms formed by sharing at least one pair of electrons and expressly excludes ionic bonds, hydrogen bonds, bonds formed by adsorption including chemical adsorption and physical adsorption, bonds formed from van der Waals bonds, and dispersion forces.

As used herein, the term "phosphorus acid group" refers to a phosphorus oxo acid having a POH moiety in which the hydrogen atom is ionizable or to the salt of the phosphorus oxo acid. In its salt or basic form, the phosphorus acid group has a metal ion or an ammonium ion replacing at least one acid proton. Included in the definition of the term "phosphorus acid group" are partial esters of phosphorus oxo acids. The partial esters of phosphorus oxo acids, as referred to "partial esters of phosphorus acid" contain at least one POH moiety and a phosphorus ester moiety represented by POR, where R is a group containing a carbon atom bonded to the oxygen atom attached to the phosphorus atom. Examples of phosphorus acid groups include groups formed from phosphinic acid, phosphonic acid, phosphoric acid, pyrophosphinic acid, pyrophosphoric acid, partial esters thereof, and salts thereof.

As used herein, the term "phosphorus acid full-ester group" refers to a phosphorus oxo acid having one or more phosphorus acid moieties, but not containing a POH moiety. Examples of phosphorus acid full-ester groups include full esters of phosphinic acid, phosphonic acid, phosphoric acid, pyrophosphinic acid, and pyrophosphoric acid.

The present invention is directed towards an organic-inorganic composite particle useful for preparing coatings having improved hiding, gloss, or whiteness. The organic-inorganic composite particle contains a primary composite particle encapsulated by a polymer layer. The primary composite particle includes an inorganic particle with polymer particles attached to the inorganic particle. As used herein, the term "encapsulates" refers to partial or complete coverage of the primary composite particle by the polymer layer. The encapsulating polymer layer contacts the polymer particles of the primary composition particle, either completely or partly covering the exterior surface of the primary composite particle; occupies voids between the polymer particles; or is present as a separate polymer phase within the polymer particles. The organic-inorganic composite particle is formed by the polymerization of monomer in the presence of the primary composite particle.

The primary composite particle has a single center inorganic particle surrounded by a plurality of polymer particles. The polymer particles are attached to the surface of each inorganic particle and minimize contact between adjacent inorganic particles. Suitable primary composite particles include inorganic particles having either complete or partial surface coverage of the inorganic particle by the polymer particles. As used herein "a plurality of polymer particles" indicates a sufficient number of polymer particles covering the surface of the inorganic particle to minimize contact with neighboring inorganic particles.

Suitable inorganic particles include pigment particles; and extender particles, also referred to in the art as filler particles. The pigment particles are commonly employed to provide light scattering sites within a dried coating, thus providing hiding or opacity to the dried coating. Extender particles are often employed to fill space within a polymer matrix or to modify the properties of a polymer matrix, such as increase tensile strength or improve the surface abrasion resistance.

The pigment particles are characterized as having an index of refraction that is significantly greater than the index of refraction of the polymer particle. Suitable pigment particles have an index of refraction of at least 1.8, preferably at least 1.9, and more preferably at least 2.0. The indices of refraction for various materials are listed in *CRC Handbook of Chemistry and Physics*, 80th Edition, D. R. Lide, editor, CRC Press, Boca Raton, Fla., 1999, pages 4-139 to 4-146.

The shape of the pigment particles is not important and can be of any shape provided that the pigment particles scatter photons having wavelengths in the spectral region of from 750 nm to 300 nm, preferably in the visible spectral region of from 700 nm to 380 nm. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes preferably have average diameters in the range of from 10 nm to 1 micron, preferably in the range of from 100 nm to 500 nm, and more preferably, in the range of from 200 nm to 300 nm. Pigment particles having nonspherical shapes preferably have average diameters, defined as their maximum dimension, of up to 1 micron, preferably up to 500 nm, and more preferably up to 300 nm. Information about the average diameters of pigment particles is typically provided by pigment particle suppliers.

The pigment particles alternatively have a uniform composition, or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, and zirconia. For example, certain embodiments of titanium dioxide particles suitable for use in coatings of the present invention have a coating of silica and a coating of alumina.

Suitable pigment particles include white pigment particles such as titanium dioxide, zinc oxide, lead oxide, zinc sulfide, lithophone, zirconium oxide, and antimony oxide; and nonwhite pigment particles. Examples of nonwhite pigment particles include iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; and carbon black. Preferred white pigment particles are titanium dioxide and zinc oxide. More preferably, white pigment particles are selected from rutile titanium dioxide and anatase titanium dioxide. Most preferably, the pigment particles are rutile titanium dioxide.

The extender particles have an index of refraction which is similar to the index of refraction of the polymer particles, and do not significantly scatter visible light. Extender particles have an index of refraction of less than 1.8 and typically greater than or equal to 1.3. Suitable extender particles include calcium carbonate, calcium sulfate, barium sulfate, mica, clay, calcined clay, feldspar, nepheline, syenite, wollastonite, diatomaceous earth, alumina silicates, aluminum oxide, silica, and talc.

The polymer particles contained in the primary composite particle are addition polymers formed by the polymerization of ethylenically unsaturated monomers. The polymer particles are further characterized as containing select functional groups. These select functional groups allow the attachment of the polymer particles to the surface of inorganic particles to form the primary composite particles. Suitable select functional groups include reactive functional groups capable of reacting with other functional groups to form covalent bonds to the surface of the inorganic particles; and absorbing groups capable of attaching to surfaces of inorganic particles. Typically, the polymer particles are formed by aqueous emulsion or suspension polymerization of at least one ethylenically unsaturated monomer containing the select functional group, optionally at least one ethylenically unsaturated second monomer, and optionally at least one multiethylenically unsaturated monomer.

Suitable ethylenically unsaturated second monomers, referred to herein as "second monomers", include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$-$C_{40}$ alkyl esters of (meth) acrylic acid; for example, methyl (meth)acrylate, ethyl(meth) acrylate, n-butyl(meth)acrylate, 2-ethylhexyl (meth)acrylate, cyclohexyl(meth)acrylate, n-octyl(meth)acrylate, n-decyl (meth)acrylate, n-dodecyl(meth)acrylate, tetradecyl(meth) acrylate, lauryl (meth)acrylate, oleyl(meth)acrylate, palmityl (meth)acrylate, and stearyl (meth)acrylate; other (meth)acrylates such as isobornyl(meth)acrylate, benzyl (meth)acrylate, phenyl(meth)acrylate, and 2-bromoethyl(meth)acrylate, alkoxyalkyl(meth)acrylate, such as ethoxyethyl(meth)acrylate, mono-, di-, trialkyl esters of ethylenically unsaturated di-and tricarboxylic acids and anhydrides, such as ethyl maleate, dimethyl fumarate, and ethyl methyl itaconate; and carboxylic acid containing monomers, such as (meth)acrylic acid, itaconic acid, fumaric acid, and maleic acid.

Other suitable monomers for preparing the polymer particles include multiethylenically unsaturated monomers, which are effective for raising the molecular weight and crosslinking the polymer particles. Examples of multiethylenically unsaturated monomers include allyl(meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, divinyl naphthalene, and diesters or triesters of phosphoric acid wherein each ester group is ethylenically unsaturated, such as phosphodi(ethyl methacrylate), which has the structure $[CH_2=C(CH_3)C(O)OCH_2CH_2O]_2P(O)OH$.

In one embodiment of the present invention, the primary composite particles is prepared from polymer particles containing absorbing groups that attach to the surfaces of the inorganic particles. Suitable absorbing groups include phosphorus acid groups, phosphorus acid full-ester groups, polyacid sidechain groups, and mixtures thereof.

The polymer particles containing phosphorus acid groups as the functional group are typically prepared by the polymerization a phosphorus acid monomer. The phosphorus acid monomer contains at least one ethylenic unsaturation and a phosphorus acid group. The phosphorus acid monomer is alternatively in the acid form or as a salt of the phosphorus acid group. Examples of phosphorus acid monomers include:

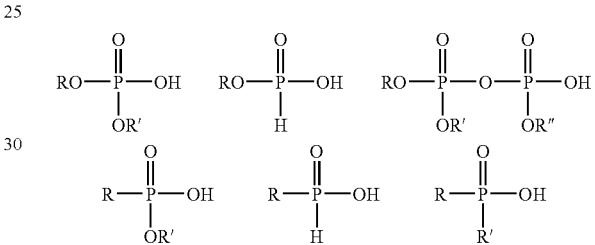

wherein R is an organic group containing an acryloxy, methacryloxy, or a vinyl group; and R' and R" are independently selected from H and a second organic group. The second organic group is alternatively saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono-or diphosphate of bis(hydroxy-methyl)fumarate or itaconate, derivatives of (meth)acrylic acid esters, such as, for example phosphates of hydroxyalkyl(meth)acrylates including 2-hydroxyethyl(meth)acrylate, 3-hydroxypropyl (meth)acrylates, and the like. Other suitable phosphorus acid monomers are phosphonate functional monomers, such as are disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus acid monomers are 1,2-ethylenically unsaturated (hydroxy)phosphinylalkyl(meth)acrylate monomers, such as are disclosed in U.S. Pat. No. 4,733,005, and include (hydroxy)phosphinylmethyl methacrylate. Preferred phosphorus acid monomers are dihydrogen phosphate monomers, which include 2-phosphoethyl(meth)acrylate, 2-phosphopropyl(meth)acrylate, 3-phosphopropyl(meth)acrylate, and 3-phospho-2-hydroxypropyl(meth)acrylate.

The polymer particles containing phosphorus acid fullester groups as the functional group are typically prepared by the polymerization of a phosphorus acid full-ester monomer. Examples of phosphorus acid full-ester groups include monoesters, diesters, and triesters of phosphorus acids. The phosphorus acid full-ester monomer contains at least one ethylenic unsaturation and at least one ester of phosphorus acid, but does not contain a phosphorus acid group having an ionizable hydrogen atom or the salt thereof. Examples of phosphorus acid full-ester monomers include:

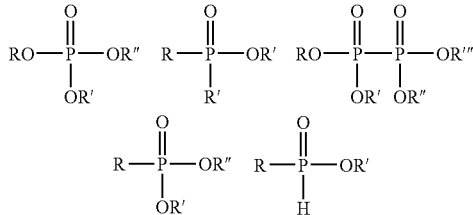

wherein R is an ethylenically unsaturated organic group such as an acryloxy, methacryloxy, or a vinyl group; and R', R", and R''' are independently selected from a second organic group. The second organic group is alternatively saturated or unsaturated.

Suitable phosphorus acid full-ester monomers include trivinyl phosphate; (2-methacryoloxy)ethyl-diethyl-phosphate; di(4-methacryloloxy)butyl-methyl-phosphate; vinyl phosphonic acid, diethyl ester; and glycerol monoacrylate, di(diethylphosphate)ester.

Polyacid sidechain groups are branches to the polymer backbone that contain at least four units of polymerized ethylenically unsaturated monomer, wherein at least half of the polymerized monomer units have an acid group pendant to the polymer sidechain. Suitable acid groups include carboxylic acids and phosphorus acids. As used herein, the definition of polyacid sidechain groups include salts of the acid groups. Suitable salts include ammonium salts, alkali metal salts such as sodium and potassium salts, and salts formed from organic bases such as diethanol amine and triethanol amine.

The polyacid sidechain groups are incorporated into the polymer particle by polymerization of an acid macromonomer. As used herein, acid macromonomer refers to an oligomer with a terminal unsaturation and having monomers with acid groups as polymerized units. The terminal unsaturation and the section of the acid macromonomer with the acid groups are attached directly or alternatively, attached through a linker group. Suitable acid macromonomers are:

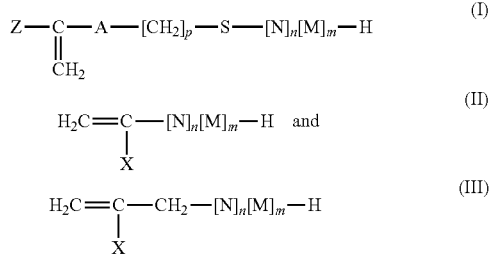

wherein N is the polymerized residue of an ethylenically unsaturated carboxylic acid monomer and has the formula:

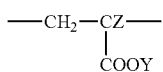

or N is the polymerized residue of a phosphorus acid monomer or a phosphorus acid full-ester monomer;

wherein M is the residue of a second ethylenically unsaturated monomer and has the formula

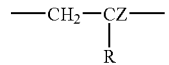

wherein the N and M residues are randomly arranged in the acid macromonomer; wherein m is the total number of M residues in the acid macromonomer and is in the range of 0 to 150; wherein n is the total number of N residues in the acid macromonomer and is in the range of 4 to 300; wherein n is greater than or equal to m; wherein the sum of n and m is in the range of 4 to 300; wherein A is a linker group selected from ester, urethane, amide, amine, and ether linkages; wherein p is in the range of 1 to 20; wherein X is selected from —COOY and R; wherein R is selected from phenyl radicals, substituted phenyl radicals, —CONH$_2$, —CONHR', —CONR'R', —CN, —CCOR', —OCOR', —Cl, and mixtures thereof, wherein R' is an alkyl or alkoxyalkyl radical independently selected from branched, unbranched, or cyclic hydrocarbon radicals having 1 to 18 carbon atoms; wherein Y is independently selected from H, NH$_4$, alkali metals and alkaline earth metals; and wherein each Z is independently selected from H and CH$_3$.

One method to prepare the acid macromonomers is polymerization of at least one ethylenically unsaturated carboxylic acid monomer and optionally at least one second ethylenically unsaturated monomer. Suitable ethylenically unsaturated carboxylic acid monomers include acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid. Preferred ethylenically unsaturated carboxylic acid monomers are acrylic acid and methacrylic acid. The second ethylenically unsaturated monomer includes styrene, vinyltoluene, α-methyl styrene, vinyl naphthalene, vinyl acetate, acrylonitrile, (meth)acrylamide, mono-and di-substituted (meth)acrylamide, various (C$_1$-C$_{20}$) alkyl esters of (meth)acrylic acid; for example, methyl(meth)acrylate, ethyl(meth)acrylate, n-butyl(meth)acrylate, isobutyl(meth)acrylate, 2-ethylhexyl(meth)acrylate, cyclohexyl (meth)acrylate, n-octyl(meth)acrylate, n-decyl(meth)acrylate, n-dodecyl(meth)acrylate, tetradecyl(meth)acrylate, n-amyl(meth)acrylate, lauryl(meth)acrylate, oleyl (meth) acrylate, palmityl(meth)acrylate, and stearyl(meth)acrylate; and other (meth)acrylates such as isobornyl(meth)acrylate, benzyl(meth)acrylate, phenyl (meth)acrylate, and 1-naphthyl (meth)acrylate; alkoxyalkyl(meth)acrylate such as ethoxyethyl(meth)acrylate. The acid macromonomers contain as polymerized units from 50 to 100 mole percent ethylenically unsaturated carboxylic acid monomer, preferably from 70 to 100 mole percent, and most preferably from 90 to 100 mole percent of these monomers.

Various conventional polymerization methods are suitable for preparing the acid macromonomers including anionic polymerization as disclosed in U.S. Pat. No. 4,158,736; radical polymerization with chain transfer agents such as cobalt complexes as described in U.S. Pat. No. 5,324,879; catalytic chain transfer polymerization with terminally unsaturated acid macromonomers used as chain transfer agents as described in U.S. Pat. No. 5,362,826; and high temperature radical polymerization as described in U.S. Pat. No. 5,710, 227. Alternatively, the acid macromonomers are prepared by conventional radical polymerization using a hydroxy-functional chain transfer agent such as 2-mercaptoethanol or an amine-functional chain transfer agent followed by the reaction of the hydroxyl group or the amine group with an ethylenically unsaturated monomer having a complementary reactive group to attach the terminal unsaturation. Examples of ethylenically unsaturated monomers with a complementary reactive group include glycidyl(meth)acrylate, isocyanatoethyl(meth)acrylate, or (meth)acrylic acid. The ethylenically unsaturated monomers with a complementary reactive group are attached to the fragment of the hydroxy-functional or amine-functional chain transfer agent by various linkages including ether, urethane, amide, amine, urea, or ester linkages. Bulk, solution, and emulsion polymerization using batch, semicontinuous, or continuous processes are suitable for preparation of the acid macromonomer.

Another method to prepare the acid macromonomers is polymerization of esters of ethylenically unsaturated carboxylic acid monomers such as ethyl acrylate, butyl acrylate, or methyl methacrylate followed by the partial or complete hydrolysis of the ester groups to obtain the carboxylic acid functionalities.

The polymer particles suitable for preparing the primary composite particles generally contain as polymerized units, from 0.1 weight % to 20 weight %, preferably from 0.5 to 15 weight %, and more preferably from 1 to 10 weight %, phosphorus acid monomer, phosphorus acid full-ester monomer, acid macromonomer, or mixtures thereof, based on the weight of the polymer particles. An aqueous dispersion containing the polymer particles having phosphorus acid groups, phosphorus acid full-ester groups, polyacid sidechain groups, or mixtures thereof, typically has a pH in the range of 3 to 10.

In another embodiment, the primary composite particle contains polymer particles that are covalently bonded to the surface of the inorganic particles. In this embodiment, the primary composite particle is prepared from polymer particles having select functional groups that are reactive functional groups capable of reacting with other functional groups to form covalent bonds to the surface of the inorganic particle. Examples of suitable reactive functional groups include acetoacetoxy groups, 1,3-dicarbonyl groups, aldehydes, acids, amines, epoxides, isocyanates, thioranes, isothiocyanates, alcohols, carbodiimides, aziridines, haloalkanes, and halophenyls. The reactive functional groups are incorporated into the polymer particle by polymerization of a reaction mixture containing an ethylenically unsaturated monomer having a reactive functional group, optionally second monomer, and optionally multiethylenically unsaturated monomer.

Examples of ethylenically unsaturated monomers having a reactive functional group are isocyanate monomers, such as isocyanato ethyl methacrylate, dimethyl meta-isopropenyl benzyl isocyanate; acetoacetoxy monomers, such as acetoacetoxy ethyl(meth)acrylate; aldehyde monomers, such as acrolein and methacrolein; amine monomers, such as t-butyl aminoethyl (meth)acrylate, dimethyl aminoethyl(meth)acrylate, aminobutyl(meth)acrylate, aminoethyl(meth)acrylate; aminopropyl(meth)acrylate; and oxazolidinoethyl (meth) acrylate; epoxy monomers, such as glycidyl(meth)acrylate; carboxylic acid monomers, such as (meth)acrylic acid, itaconic acid, fumaric acid, maleic acid, β-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid; hydroxy containing monomers, such as hydroxyalkyl (meth)acrylates including 2-hydroxyethyl(meth)acrylate and 3-hydroxypropyl (meth)acrylate; halogenated monomers, such as bromopropyl(meth)acrylate; and halomethyl-styrene.

The polymer particles containing the select functional groups typically have glass transition temperatures in the range of −70° C. to 120° C. Generally, the polymer particles useful for preparing the primary composite particle have weight average molecular weights of at least 10,000, preferably at least 50,000, and more preferably, at least 100,000. Weight average molecular weight is measured by gel permeation chromatography. The average diameter of the polymer particles is typically in the range of 10 nanometer (nm) to 1 micron, preferably in the range of from 20 nm to 700 nm, and more preferably in the range of from 60 nm to 500 nm. The average diameter of the polymer particles is measured by a quasi-elastic light scattering technique.

The polymer particles having select functional groups are prepared by any process which provides polymerization of ethylenically unsaturated monomers having select functional groups. Suitable processes include suspension or emulsion polymerization, including for example, the processes disclosed in U.S. Pat. Nos. 5,356,968 and 5,264,530. An alternate process to prepare the polymer particles is solution polymerization followed by the conversion of the solution polymer to polymer particles by various methods known in the art. Aqueous emulsion polymerization is a preferred process for preparing the polymer particles having select functional groups. Temperatures suitable for aqueous emulsion polymerization processes are in the range of from 20° C. to less than 100° C., preferably in the range of from 40° C. to 95° C., and more preferably in the range of from 50° C. to 90° C. Suitable polymerization processes, which include emulsion polymerization, solution polymerization, and suspension polymerization processes, are typically conducted as batch, semicontinuous, or continuous processes.

The emulsion polymerization process optionally employs a seed polymer emulsion to control the number of particles produced by the polymerization, as is known in the art. Suitable seed polymer emulsions include polymer emulsions having average particle diameters in the range of from 10 nm to 60 nm. Alternatively, the seed polymer particles are prepared by adding an initial quantity of a monomer emulsion to the aqueous reaction medium and polymerizing the added monomer. A technique to control the particle size of the polymer particles is by adjusting the initial surfactant charge, as is known in the art.

A polymerization initiator is typically added to the aqueous reaction medium to initiate polymerization of the ethylenically unsaturated monomers. The polymerization initiator can be added at any time, prior to the addition of the monomer, after the addition of the monomer, and during the addition of the monomer. Examples of suitable polymerization initiators include polymerization initiators that thermally decompose at the polymerization temperature to generate free radicals. Examples include both water-soluble and water-insoluble species. Polymerization initiators are used alone, and alternatively, as the oxidizing component of a redox system, which also includes a reducing component. Examples of redox catalyst systems include t-butyl hydroperoxide/sodium formaldehyde sulfoxylate/Fe(II), and ammonium persulfate/sodium bisulfite/sodium hydrosulfite/Fe(II).

Chain transfer agents are optionally added to the aqueous reaction medium to control molecular weight of the polymer particle. Examples of chain transfer agents include mercaptans, polymercaptans, and polyhalogen compounds. Examples of suitable chain transfer agents include alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to 10% by weight, based on the weight of the monomers in the monomer mixture, is used to prepare the polymer particles. Other techniques for controlling molecular weight, known in the art, include selecting the ratio of the initiator to total monomer amount.

Catalyst and/or chain transfer agent are optionally dissolved or dispersed in separate or the same fluid medium, and gradually added to the polymerization vessel. Monomer, either neat, dissolved, or dispersed in a fluid medium, is optionally added simultaneously with the catalyst and/or the chain transfer agent. Amounts of initiator and/or catalyst are optionally added to the aqueous reaction medium to "chase" residual monomer after polymerization has been substantially completed, so as to polymerize the residual monomer, as is well known in the polymerization arts.

The aqueous reaction medium typically contains surfactant to stabilize the growing polymer particles during polymerization and to discourage aggregation of the polymer particles in the resulting aqueous polymer dispersion. One or more surfactants, including anionic and nonionic surfactants, and mixtures thereof, is commonly used. Many examples of surfactants suitable for emulsion polymerization are given in *McCutcheon's Detergents and Emulsifiers* (MC Publishing Co. Glen Rock, NF), published annually. Other types of stabilizing agents, such as protective colloids, are optionally used. However, it is preferred that the amount and type of stabilizing surfactant or other type of stabilizing agent employed during the polymerization reaction be selected so that residual stabilizing agent in the resulting aqueous polymer dispersion does not significantly interfere with the properties of the aqueous polymer dispersion, the properties of compositions including the aqueous polymer dispersion, or articles prepared from the aqueous polymer dispersion.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units. Suitable nonionic surfactants include, for example, alkyl phenoxypolyethoxy ethanols having alkyl groups of from 7 to 18 carbon atoms and from 6 to 60 oxyethylene units, such as, for example, heptyl phenoxypolyethoxyethanols; ethylene oxide derivatives of long chained carboxylic acids, such as lauric acid, myristic acid, palmitic acid, oleic acid, or mixtures of acids, such as those found in tall oil, containing from 6 to 60 oxyethylene units; ethylene oxide condensates of long chained alcohols such as octyl, decyl, lauryl, or cetyl alcohols, containing from 6 to 60 oxyethylene units; ethylene oxide condensates of long chain or branched chain amines, such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers, such as hydroxyethyl cellulose, methyl cellulose, and polyvinyl alcohol, are also usable.

In one embodiment, the polymer particles containing phosphorus acid groups as the functional group are prepared by polymerization of phosphorus acid monomer in an aqueous reaction medium having a pH of less than 2, preferably less than or equal to about 1.7, and more preferably less than or equal to about 1.5. Suitable pH ranges for the low pH polymerization of the phosphorus acid monomer include pH values in the range of from about −1 to less than about 2, preferably from about −1 to less than about 1.8, and more preferably from about −1 to about 1.5. In a further embodiment, the polymer particles containing phosphorus acid groups are prepared by the polymerization of phosphorus acid monomer at a pH in the range of from 0 to less than about 1.8, preferably in the range of from 0 to about 1.7, and more preferably in the range of from 0 to about 1.6. The pH of the aqueous reaction medium is adjusted to a low pH by the addition of strong acids, such as sulfuric acid; sulfurous acid; alkyl sulfonic acids, such as methyl sulfonic acid and alkyl ethylene oxide sulfonic acids; aryl sulfonic acids, such as benzosulfonic acid; dodecyl benzene sulfonic acid; and naphthalene sulfonic acid; sulfamic acid; hydrochloric acid; iodic acid; periodic acid; selenic acid; chromic acid; nitric acid; pyrophosphoric acid; trifluoroacetic acid; dichloroacetic acid; trichloroacetic acid; dihydroxymalic acid; dihydroxytartaric acid; maleic acid; oxalic acid; and trihydroxybenzoic acid.

The primary composite particle including polymer particles absorbed to the surface of the inorganic particle is prepared by first admixing a first aqueous medium containing a dispersion of inorganic particles, an aqueous polymer dispersion containing the dispersed polymer particles having absorbing groups, and optionally dispersant. Next, the polymer particles having absorbing groups are allowed sufficient time to attach to the pigment particles to form the primary composite particles. The attachment of the polymer particles having the absorbing groups to the inorganic particles is believed to occur by absorption and is also believed to be spontaneous and will continue until the occurrence of one of the following: the polymer particles having absorbing groups are completely adsorbed to the surfaces of the inorganic particles; the surfaces of the inorganic particles are completely covered with polymer particles absorbing groups; or an equilibrium is achieved between adsorbed polymer particles having absorbing groups and polymer particles having absorbing groups remaining dispersed in the aqueous medium. The time required for the completion of adsorption typically depends upon one or more of the following parameters: the pigment particle type, the surface treatment of the pigment particle, dispersant type and concentration, the concentrations of the inorganic particles and the polymer particles having absorbing groups, and temperature. The time required for the complete adsorption of the polymer particles to the inorganic particles varies from instantaneously upon admixing of the first aqueous medium and the aqueous polymer dispersion to longer times, which are typically on the order of several hours in duration such as 6 to 12 hours, although still longer times of up to days or weeks may be required, depending on the above mentioned parameters. Pre-mixing the aqueous medium containing the inorganic particles and the polymer particles having absorbing groups typically reduces the time for the completion of adsorption. For primary composite particles prepared with titanium dioxide particles as the pigment particles, adsorption of the polymer particles having absorbing groups typically requires about 1 to about 12 hours for complete adsorption. Other optional components are permissible in the aqueous medium during the formation of the composite particle, provided these components do not substantially inhibit or substantially interfere with the adsorption of the polymer particle having absorbing groups to the inorganic particle. Examples of other components include co-solvents; wetting agents; defoamers; surfactants; biocides; other copolymers; and other pigments.

Preferably the primary composite particle is formed in an aqueous medium in the absence of other co-polymers and other pigments. Optionally, the primary composite particle is prepared with levels of dispersant in the range of from 0 to 2 weight %, preferably from 0 to 1 weight %, and more preferably from 0 to 0.5 weight %, based on the weight of the pigment particle. Suitable dispersants include anionic polyelectrolyte dispersants such as co-polymerized maleic acid, co-polymers including co-polymerized acrylic acid, co-polymers including co-polymerized methacrylic acid, and the like; and carboxylic acids containing molecules such as tartaric acid, succinic acid, and citric acid.

Alternatively, the primary composite particles containing the polymer particles having absorbing groups is prepared by dispersing dry inorganic particles into the second aqueous medium containing the polymer particles having absorbing groups. Typically, high shear mixing is employed to disperse the inorganic particles.

Mixing is typically provided to ensure that the inorganic particles and the polymer particles having absorbing groups are distributed uniformly in the combined aqueous medium. It is preferred that the first aqueous medium containing the inorganic particle dispersion or slurry is added to the second aqueous medium containing the polymer particles having absorbing groups, rather than vice versa, so that situations in which there is a temporary "excess" of inorganic particles relative to the polymer particles having absorbing groups, and the possibility of grit formation through bridging flocculation of the polymer particles having absorbing groups due to the excess of inorganic particles, are avoided.

In an alternative embodiment, the primary composite particle has a plurality of polymer particles covalently bonded to the inorganic particle, wherein the polymer particles are indirectly attached to the inorganic particle through a linkage that has a covalent bond with the surface of the inorganic particle and a second covalent bond with the polymer particle. The linkage is formed from a select coupling agent having a first functional group that reacts to form a first covalent bond with the surface of the inorganic particle and a second functional group that reacts with the select functional group of the polymer particle to form a second covalent bond. The inorganic particle that is contained in this primary composite particle, has a surface containing a substance selected from metals, metal oxides, sulfides, salts, nonmetals, nonmetal sulfides, nonmetal oxides, and combinations thereof. The surface of the inorganic particle is the native surface of the inorganic particle or a surface having a surface treatment thereon, wherein the surface treatment provides a suitable surface for formation of covalent bonds. The first covalent bond is formed with an atom on or at the surface of the inorganic particle, including any optional coating or surface treatment. In the presence of water, the surface of the inorganic particle typically has hydroxyl groups. In this primary composite particle, the reacted coupling agents are covalently bonded to atoms on or at the surface of the pigment particle by bonds selected from: ether bonds, thiol ether bonds, and siloxane ether bonds. Suitable atoms on or at the surface of the inorganic particle for forming the first covalent bond include Ti, Al, Zr, Si, Zn, Cr, Sn, Fe, C, and Pb. The polymer particles are attached to the reacted coupling agents by second covalent bonds containing groups such as esters, amides, ethers, urethanes, thiol ethers, amines, or ureidos.

The primary composite particle having covalently bonded polymer particles is formed by first admixing the inorganic particle and a coupling agent. The coupling agent has a first functional group and a second functional group. The first functional group of the coupling agent reacts or is allowed to react with the inorganic particle to form a modified inorganic particle, in which the reacted first functional group of the coupling agent forms a first covalent bond with the inorganic particle. Next, the modified inorganic particle is admixed with the polymer particles having a reactive functional group, and the second functional group of the coupling agent, which is covalently bonded to the pigment particle, and the reactive functional groups of the polymer particle react or are allowed to react to form the primary composite particle having covalently bonded polymer particles. The reaction of the second functional group of the coupling agent and the reactive functional group of the polymer particle similarly forms a second covalent bond. In this embodiment, the polymer particles are attached to the surface of the inorganic particle by linkages, which are molecular chains forming first covalent bonds with the surface of the inorganic particle and second covalent bonds with the polymer particles. The linkages are formed by the reacted coupling agents.

The coupling agent typically has a molecular weight of less than 10,000, preferably less than 1,000, and most preferably less than 500. The reacted coupling agent has a reacted first functional group that forms a first covalent bond with the inorganic particle and has a reacted second functional group that forms a second covalent bond with the polymer particle. Alternatively, the coupling agent contains more than one first functional group, provided that the coupling agent is bonded to only one inorganic particle. Alternatively, the coupling agent also contains more than one second functional group. For example, a coupling agent such as 3-aminopropyl-trimethoxysilane has three trimethoxysilane groups as the first functional groups. This coupling agent is capable of forming one, two, or three covalent bonds with the inorganic particle. Similarly, the coupling agent alternatively contains more than one second functional group and is capable of alternatively forming more than one covalent bond with a single polymer particle, or forming multiple individual covalent bonds with two or more polymer particles. Suitable levels of coupling agent to form the primary composite particle include levels of from 0.1 to 50 equivalents of the second function group for each equivalent of reactive functional group of the polymer particle.

Suitable first functional groups for attaching the coupling agent to the inorganic particle include alkoxysilanes, acyloxysilanes, halosilanes, and silanols.

Second functional groups suitable for reaction with the reactive functional groups of the polymer particle include, for example, isocyanates and isothiocyanates, which react with a reactive functional group selected from alcohols, amines, ureas, and anhydrides; aldehyde groups, which react with a reactive functional group selected from acetoacetoxy groups and amines; acetoacetoxy groups, which react with a reactive functional group selected from aldehydes and amines; epoxides, thioranes, and aziridines, which react with a reactive functional group selected from alcohols, carboxylic acids, anhydrides, amines, and mercaptans; carbodiimides, which react with a reactive functional group selected from carboxylic acids, alcohols, amines, and mercaptans; haloalkane and halomethylphenyl groups, which react with a reactive functional group selected from amines and carboxylic acids; amines and thiols, which react with a reactive functional group selected from epoxides, aziridines, thioranes, acetoacetoxy groups, isocyanates, isothiocyanates, and carbodiimides; and carboxylic acids, which react with a reactive functional group selected from epoxides, aziridines, thioranes, and carbodiimides.

Examples of suitable coupling agents include: aminosilanes, such as 4-aminobutylmethyldiethoxysilane, 3-aminopropyltrimethoxysilane, and N-(2-aminoethyl)-3-aminopropyldiethylisopropoxysilane; mercaptosilanes, such as (mercaptomethyl)dimethylethoxysilane, di-4-mercaptobutyldimethoxysilane, and 3-mercaptopropyltriisopropoxysilane; (meth)acrylosilanes, such as 3-methacryloxypropyldimethylethoxysilane and 3-acryloxypropyltrimethoxysilane; epoxysilanes, such as (3-glycidoxypropyl)methyldimethoxysilane and 2-(3,4-epoxycyclohexyl)ethyltrimethoxysilane; haloalkylsilanes, such as 3-chloropropyltrimethoxysilane, 4-bromobutylmethyldibutoxysilane, and 5-iodohexyldiethylmethoxysilane; iso(thio)cyanatosilanes, such as 3-isocyanatopropyltrimethoxysilane and 3-isothiocyanatopropylmethyldimethoxysilane; alcohol-functional silanes, such as 3-hydroxybutylisopropyldimethoxysilane, bis(2-hydroxyethyl)-3-aminopropyltriethoxysilane; (propyltrimethoxysilane)sulfide terminated poly(hydroxyethylacrylate); halophenylsilanes, such as bromophenyltrimethoxysilane and (2-(iodophenyl)ethyl)ethyldimethoxysilane; halomethylphenylsilanes, such as bis(chloromethylphenyl)dimethoxysilane and bromomethylphenyldimethylisopropoxysilane; carbodiimidesilanes, such as bis(propyltrimethoxysilane)carbodiimide and N-ethyl-N'-(propylethoxydimethoxysilane)-carbodiimide; aldehyde-functional silanes, such as 3-(trimethoxysilyl) propanal and (propyltrimethoxysilane)sulfide terminated methylmethacrylate-acrolein copolymer; and 1,3-diketone functional silanes, such as (3,5-hexandione)triethoxysilane, 3-(trimethoxysilyl)propyl acetoacetate, and (butyltriethoxysilane)sulfide terminated methylmethacrylate-butyl acrylate-acetoacetoxyethyl methacrylate copolymer.

Any one of the group of reactions including the reaction between the first functional group and the inorganic particle; and the reaction between the second functional group and the reactive functional group of the polymer particle, is optionally conducted in the presence of a catalyst. For example, tertiary amines and tin salts are suitable catalysts for the reaction between an isocyanate group as the second functional group and an alcohol as the reactive functional group. The extent of reaction of the first functional group, the second functional group, and the reactive functional group is determined using conventional analytical techniques such as infrared spectroscopy, nuclear magnetic resonance spectroscopy, and ultraviolet-visible spectroscopy.

One process to prepare the primary composite particle having covalently bonded polymer particles includes the steps of admixing the inorganic particle and the coupling agent; forming the modified inorganic particle by reacting or allowing to react the inorganic particle and the first functional group of the coupling agent; admixing the modified inorganic particle into an aqueous dispersion containing the polymer particle having a reactive functional group; and forming the primary composite particle having covalently bonded polymer particles by reacting or allowing to react the second functional group of the reacted coupling agent, which is covalently bonded to the surface of the inorganic particle, with the reactive functional group of the polymer particle. The modified inorganic particle is admixed and dispersed into the aqueous dispersion containing the polymer particle having a reactive functional groups as a dry material. Alternatively, the modified inorganic particle is provided as an aqueous dispersion and admixed with the aqueous dispersion containing the polymer particle having a reactive functional group.

Primary composite particles suitable for preparing the organic-inorganic composite particle typically have weight ratios of the polymer particles to the inorganic particles in the range of from 0.2 to 1.4, preferably in the range of from 0.3 to 1, and more preferably, in the range of from 0.4 to 0.7. Typically, the primary composite particles are provided as aqueous dispersions containing the primary composite particles dispersed in an aqueous medium.

One process suitable for preparing the organic-inorganic composite particle of this invention is aqueous emulsion polymerization. In this process, the organic-inorganic composite particle is prepared by polymerizing at least one ethylenically unsaturated monomer in the presence of the primary composite particle to form a polymer layer that encapsulates the primary composite particle. The polymerization process to prepare the organic-inorganic composite particle includes: providing an aqueous dispersion including primary composite particles dispersed in an aqueous medium, wherein each of the primary composite particles contain an inorganic particle and polymer particles attached to the inorganic particle; and polymerizing at least one monomer in the presence of the primary composite particles to form a polymer layer encapsulating the primary composite particles and to provide the organic-inorganic composite particles.

While not wishing to be bound by theory, the inventors believe that the polymer particles attached to the inorganic particle act as seed polymers to promote the formation of the polymer layer on the primary composite particle containing the inorganic particle. In contrast, conventional polymerizations onto inorganic particles, such as titanium dioxide, require the formation of a polymer layer on the surface of an inorganic particle. The monomers or the forming polymer layer need a degree of compatibility with the inorganic surface to minimize formation of polymer in the aqueous phase of the reaction mixture. Typically, in conventional processes, specific reaction conditions are necessary, such as a nonionic system, or the surface of the inorganic particle requires treatment, in order to establish a low energy interface between the organic and inorganic phases of the composite particle. The inventors believe that in the present invention, the polymer particles that are attached to the inorganic particle provide a stable organic-inorganic interface for the polymerization of monomer onto the primary composite particle. The attached polymer particles are believed to act as polymerization seeds, wherein the monomer is polymerized within the polymer particle or on the surface of the polymer particle. Further, the resulting polymer layer is believed to tie the polymer particles in place to provide a stable organic-inorganic composite particle.

In the aqueous emulsion polymerization process for preparing the organic-inorganic composite particles, an aqueous reaction mixture is prepared containing the primary composite particles dispersed in an aqueous medium. The aqueous reaction mixture optionally contains other synthesis adjuvants such as buffers, cosolvents, surfactants, biocides, and defoamers. Preferably, the aqueous reaction mixture has a pH in the range of from 7 to 10. Suitable aqueous reaction mixtures include ionic systems and nonionic systems. Ionic systems contain ionic species such as cationic species and anionic species. Nonionic systems are characterized as being substantially free of ionic species such as acid containing monomers, buffers, or persulfate initiators. As used herein, "substantially free of ionic species" refers to systems having a concentration of ionic species of less than 0.05 millimole per liter. Ionic systems are characterized as having a concentration of ionic species of at least 0.05 millimole per liter, preferably at least 0.1 millimole per liter, and more preferably at least 0.25 millimole per liter. Preferably, the aqueous reaction mixture is an ionic system. More preferably, the aqueous reaction mixture is an anionic system. Suitable levels of the primary composite particles in the aqueous reaction mixture are in the range of 5 weight % to 40 weight %, based on the weight of the aqueous reaction mixture. Typically, mixing is employed to minimize localized concentrations of the components in the aqueous medium.

The polymer layer is an addition polymer containing as polymerized units at least one ethylenically unsaturated monomer. The polymer layer is prepared by adding the at least one ethylenically unsaturated monomer to the aqueous reaction mixture and polymerizing the added monomer to form the polymer layer on the primary composite particle. Methods of monomer addition include adding a monomer mixture containing the at least one ethylenically unsaturated monomer and optional ingredients such as surfactants, water, solvents, buffers, and initiator components. The at least one ethylenically unsaturated monomer may be added neat or as an emulsion in water. The monomer mixture may be added in one or more additions, or continuously in either a linear or nonlinear manner, over the reaction period, or combinations thereof.

Typically an initiator is added to the aqueous reaction mixture to initiate polymerization of the at least one ethylenically unsaturated monomer. The polymerization initiator can be added at any time, prior to, during, or after the addition of the monomer mixture. Examples of suitable polymerization initiators include polymerization initiators mentioned hereinabove for the polymerization of the polymer particles having select functional groups. The polymerization initiators are used alone, and alternatively, as the oxidizing component of a redox system, which also includes a reducing component. Examples of redox catalyst systems are mentioned hereinabove.

The reaction mixture optionally includes chain transfer agents to control the molecular weight of the polymer layer. Surfactants are commonly added to aid in the stabilization of the organic-inorganic composite particles in the water. Suitable levels of surfactant are in the range of 0.1 to 10 weight %, preferably in the range of 1 to 5 weight %, based on the weight of the polymer layer. Preferred are anionic surfactants.

Generally, the reaction temperature for preparation of the polymer layer is in the range of from 30° C. to 95° C., preferably in the range of 45° C. to 90° C., and most preferably in the range of from 50° C. to 75° C.

Suitable emulsion polymerization processes include batch, semicontinuous, and continuous polymerization processes. Sequential polymerization techniques involving two or more separate polymerization steps are suitable for preparing polymer layer containing two or more compositionally different polymer phases.

Suitable ethylenically unsaturated monomers for preparing the polymer layer include the second monomers and the multiethylenically unsaturated monomers listed hereinabove. The polymer layer is a homopolymer or alternatively, a copolymer containing as polymerized units two or more different ethylenically unsaturated monomers. In one embodiment, the polymer layer contains as polymerized units from 0.1 to 10 weight %, preferably at least 1 to 8 weight %, and more preferably, at least 2 to 6 weight % of at least one ionic monomer. The addition of ionic monomer as a polymerized component of the polymer layer may provide increased aqueous stability to the organic-inorganic composite particle. Suitable ionic monomers include acid containing monomers, amine containing monomer, and amide containing monomers. Preferred ionic monomers for including as polymerized units in the polymer layer include (meth)acrylic acid, (meth) acrylamide, maleic anhydride, itaconic acid, fumaric acid, sodium vinyl sulfonate, and sodium styrene sulfonate.

The glass transition temperature of the polymer layer is preferably in the range of from −50° C. to 130° C. For organic-inorganic composite particles useful in the preparation of dried coatings with improved hiding, the polymer layer has a glass transition temperature of at least −10° C., preferably in the range of from −10° C. to 120° C., and more preferably in the range of from zero ° C. to 110° C. The organic-inorganic composite particle typically contains from 0.5 to 82 weight %, preferably from 1 to 75 weight %, and more preferably from 5 to 50 weight % of the polymer layer, based on the weight of the organic-inorganic composite particle. The organic-inorganic composite particle typically contains from 0.5 to 82 weight %, preferably from 1 to 75 weight %, and more preferably from 5 to 50 weight % of the polymer particles that are attached to the inorganic pigment, based on the weight of the organic-inorganic composite particle. The weight ratio of the polymer particles to the polymer layer in the organic-inorganic composite particle is typically in the range of from 1:10 to 10:1, preferably in the range of 1:8 to 8:1, and more preferably in the range of from 1:6 to 6:1. Further, the combined weight % of polymer in the organic-inorganic composite particle, which is defined as the sum of the weight % of the polymer particles and the weight % of the polymer layer, is typically in the range of 5 to 90 weight %, preferably in the range of 10 to 80 weight %, and more preferably in the range of from 20 to 70 weight %, based on the weight of the organic-inorganic composite particle.

Electron microscopy is suitable for observing the encapsulation of the primary composite particle by the polymer layer. Alternately, the formation of the polymer layer is determined by the difference in the mass of organic-inorganic composite particle compared to the primary composite particle prior to polymerization of the polymer layer.

The organic-inorganic composite particles of this invention are useful in aqueous compositions, which are suitable for providing opaque dried coatings. These aqueous compositions contain the organic-inorganic composite particles, an aqueous medium, and optionally, a binder. The aqueous compositions are typically formed by first preparing the organic-inorganic composite particles and then admixing these composite particles with the optional binder. The binder is a polymer that is film forming at or below the application condition of the aqueous composition. The binder typically has glass transition temperatures in the range of from −60° C. to 80° C., preferably in the range of from −25° C. to 40° C., and more preferably, in the range of from −15° C. to 30° C., as calculated by the Fox equation. Polymers suitable as binders include homopolymers, a copolymers, an interpenetrating network polymers, and a blend of two or more polymers or copolymers. Examples of suitable binders include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and the like, and mixtures thereof. The binder may be present in the aqueous composition as dispersed binder polymer particles, solubilized polymers, or as partially solubilized polymer particles. Preferred are aqueous compositions containing the binder as binder polymer particles dispersed in the aqueous medium. Preferred are binder polymer particles having an average diameter in the range of from 80 nm to 500 nm.

A suitable range for the level of the optional binder in the aqueous composition is from 10 to 90 volume %, based on the volume of the aqueous composition. A suitable range for the organic-inorganic composite particles is from 10 to 75 volume %, based on the volume of the aqueous composition. The aqueous composition may also contain extender particles, which are inorganic particles that are not contained in the organic-inorganic composite particles. A suitable range for the amount of extender included in the aqueous composition is from 0 to 70 volume %, based on the volume of the aqueous composition. Typically, the aqueous composition of this invention, when used to prepare opaque dried coatings, has a solids level in the range of from 20 to 50 volume %, based on the volume of the aqueous composition. The pH of the aqueous composition is typically in the range of from 3 to 11, and preferably, in the range of from 7 to 10. A suitable viscosity range for the aqueous composition is from 50 to 130 Kreb units (KU), preferably from 70 to 110 KU, and more preferably from 90 to 100 KU.

The aqueous composition optionally contains coalescents or plasticizers to provide the polymers contained in the organic-inorganic composite particles, or the optional binder with effective film formation temperatures at or below the application temperature. The level of optional coalescent is in the range of from 1 weight % to 40 weight %, based on the weight of the polymer solids. The polymer solids is the total weight of polymer in the aqueous composition, and includes the polymer contained in the organic-inorganic composite particles and the polymer binder.

A volatile organic compound ("VOC") is defined herein as a carbon containing compound that has a boiling point below 280° C. at atmospheric pressure. Compounds such as water and ammonia are excluded from the definition of VOC. The VOC level of a composition is the total amount of one or more volatile organic compounds contained in the composition.

Frequently a VOC is deliberately added to a paint or a coating composition to improve film formation of the resulting coating or to aid in the application properties of the composition employed to prepare the coating. Examples of VOCs are glycol ethers, organic esters, aromatic compounds, ethylene and propylene glycols, and aliphatic hydrocarbons. Additionally, the preparation of a paint or coating composition may introduce adventitious VOCs from various ingredients such as the aqueous dispersion containing the organic-inorganic composite particles, the optional aqueous dispersion containing binder polymer particles, biocides, soaps, dispersants, and thickeners. These typically account for less than 20 g VOC per liter of the aqueous composition. Additional methods such as steam stripping and choice of low VOC containing additives like biocides, defoamers, soaps, dispersants, and thickeners can be used to further reduce the aqueous composition to less than 5 g VOC per liter of the aqueous composition.

Preferably, the aqueous composition of containing the organic-inorganic composite particles of this invention has a VOC level of less than 150 grams per liter (g/liter) of the aqueous composition; more preferably the aqueous composition has a VOC level of less than 100 g/liter of the aqueous composition; and even more preferably the aqueous composition has a VOC level of less than 50 g/liter of the aqueous composition.

In addition, the aqueous composition optionally includes other components, including without limitation, other polymers, surfactants, other pigments, other extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, polymer particles having internal voids, and antioxidants.

A dried coating containing the organic-inorganic composite particle is typically prepared by applying the aqueous composition to a substrate by conventional methods such as, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the coating composition is typically in the range of from 1 micron to 250 microns. The aqueous composition is applied onto a substrate as a single coat or multiple coats. The coating is allowed to dry at ambient conditions, such as, for example, at from 0° C. to 35° C., and in the alternative, dried at elevated temperatures such as, for example, from 35° C. to 150° C.

The dried coating containing the organic-inorganic composite particle is suitable as a protective coating and in the alternative, as an aesthetic coating. Examples of suitable coatings include architectural coatings such as interior or exterior paint coatings, including masonry coatings; wood coatings and treatments; maintenance coatings such as metal coatings; paper coatings; leather coatings; polishes for leather; and traffic coatings such as those coatings used to provide markings on roads, pavements, and runways. Substrates suitable for the application of the aqueous composition include, for example, processed timber such as medium density fiber board; chip boards, and laminates; mineral substrates such as masonry, cement, fiber cement, cement asbestos, plaster, plaster board, glazed and unglazed ceramic; metal substrates such as galvanized iron, galvanized steel, cold rolled steel, Zincalum metal Zincalum II metal, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

The organic-inorganic composite particle is useful for preparing dried coatings having a desired level of hiding, but with lower levels of pigment than conventional dried coatings prepared without these organic-inorganic composite particles. These dried coatings formulated with lower levels of pigment have lower densities than conventional dried coatings, thus allowing the preparation of low weight dried coatings. Low weight dried coatings are important in applications such as coatings for transportation vehicles such as cars, buses, trucks, trains, and airplanes. Alternatively, these organic-inorganic composite particles are useful for preparing dried coating having a desired level of pigment but providing a higher level of hiding than conventional dried coatings prepared without these organic-inorganic composite particles.

The organic-inorganic composite particles are also suitable as fillers or pigments in plastics.

The following examples are presented to illustrate the composition and the process of the invention. These examples are intended to aid those skilled in the art in understanding the present invention. The present invention is, however, in no way limited thereby.

Preparation of an Aqueous Dispersion Containing Polymer Particles Having Absorbing Groups An aqueous dispersion containing the polymer particles having absorbing groups was prepared in a 5-liter, four-necked round bottom flask equipped with a paddle stirrer, a thermometer, a nitrogen inlet, and a reflux condenser.

To the flask was added 1600 grams (g) of deionized water and 6 g of concentrated sulfuric acid. The pH of the water in the flask was approximately 1. A mixture of 6.0 g of surfactant-A (a surfactant having an average composition of lauryl-(ethylene oxide)$_4$ sodium sulfate, 31% in water) in 10 g deionized water was added to the flask. The contents of the flask was heated to 85° C. under a nitrogen atmosphere. A first monomer emulsion (ME-1), which contained 24 g deionized water, 2 g surfactant-A, 16 g butyl acrylate, and 56 g methyl methacrylate, was added to the flask. The container for ME-1 was rinsed with 40 g deionized water, and the rinse water was added to the flask. Next, a mixture of 4.8 g sodium persulfate in 40 g deionized water was added to the flask. After maintaining the contents of the flask at 85° C. for 10 minutes, a second monomer emulsion (ME-2), which contained 320 g deionized water, 32 g surfactant A, 248 g butyl acrylate, 832 g methyl methacrylate, 12 g acrylic acid, and 36 g phosphoethyl methacrylate, was added to the flask at a rate of 15 grams per minute, while maintaining the contents of the flask at a temperature of 85° C. After the complete addition of ME-2, the container for ME-2 and the addition lines for adding ME-2 to the flask were rinsed with 70 g of deionized water, which was subsequently added to the flask. The contents of the flask was maintained at 85° C. for 10 minutes, and then cooled to room temperature. Next, a solution of 32 g ammonium hydroxide (28%) in 40 g deionized water was added to the flask and the contents of the flask was filtered to remove any coagulum. The resulting dispersion, Latex A, had a solids content of 35.8 weight % and a pH of 9. The polymer particles of Latex A had an average particle diameter of 110 nm and a glass transition temperature of 55° C.

Preparation of Primary Composite Particles

Primary Composite Particle Composition A—An aqueous dispersion containing primary composite particles having polymer particles absorbed on titanium dioxide particles was formed by slowly adding 109.2 g of Ti-Pure™ RPD Vantage titanium dioxide powder (E.I. DuPont de Nemours and Company) to 195 g of Latex A while stirring using a high speed disperser at 2,500 rpm. After the complete addition of the titanium dioxide powder, the aqueous mixture was stirred for 15 minutes. The resulting aqueous dispersion containing primary composite particles, Primary Composite Particle Composition A, was mixed on a roller mill overnight. Primary Composite Particle Composition A contained 58.7 weight % solids and had a pH of 8.3. The primary composite particles of Primary Composite Particle Composition A had an average particle diameter of 456 nm, and contained 39 weight % polymer particles and 61 weight % titanium dioxide.

Primary Composite Particle Composition B—An aqueous dispersion containing primary composite particles having polymer particles absorbed on titanium dioxide particles was formed by slowly adding 207.72 g of Ti-Pure™ R-746 titanium dioxide slurry (E.I. DuPont de Nemours and Company) to 266.35 g of Latex A while stirring using a high speed disperser at 2,500 rpm. After the complete addition of the titanium dioxide powder, the aqueous mixture was stirred for 15 minutes. The resulting aqueous dispersion containing primary composite particles, Primary Composite Particle Composition B, was mixed on a roller mill overnight. Primary Composite Particle Composition B contained 53.7 weight % solids and had a pH of 8.2. The primary composite particles of Primary Composite Particle Composition B had an average particle diameter of 474 nm, and contained 37.5 weight % polymer particles and 62.5 weight % titanium dioxide.

Primary Composite Particle Composition C—A titanium dioxide slurry was prepared by slowly adding 463 g of TiPure™ RPD Vantage titanium dioxide powder to a solution containing 4.18 g ammonia (28% active) and 7.41 Tamol™ 731A dispersant (Rohm and Haas Company) in 122.27 g deionized water while stirring with a high speed disperser. After the addition of the titanium dioxide was complete, the slurry was mixed for an addition 15 minutes. An aqueous dispersion containing primary composite particles having polymer particles absorbed on titanium dioxide particles was prepared by admixing 68.91 g of the titanium dioxide slurry to 90.03 g of Latex A. The resulting aqueous dispersion containing primary composite particles, Primary Composite Particle Composition C, was mixed on a roller mill overnight. Primary Composite Particle Composition C contained 54.3 weight % solids and had a pH of 9.3. The primary composite particles of Primary Composite Particle Composition C had an average particle diameter of 498 nm, and contained 37.4 weight % polymer particles and 62.6 weight % titanium dioxide.

EXAMPLE 1

Preparation of Organic-Inorganic Composite Particles

Example 1.1

An aqueous dispersion containing organic-inorganic composite particles was prepared in a flask having an overhead stirrer, a condenser, a thermocouple, and a nitrogen tube. To the flask was added 91.13 g of Primary Composite Particle Composition A, followed by the addition of 2.73 g of methyl methacrylate and 44.13 g deionized water, with stirring. Next, 2.57 g of a 0.5 weight % sodium persulfate aqueous solution was added to the contents of the flask. The contents of the flask was stirred under a nitrogen atmosphere and heated to a temperature of 70° C. The contents of the flask were maintained at 70° C. for 4 hours. The resulting aqueous dispersion containing organic-inorganic composite particles, Example 1.1, had a solids level of 39.8 weight % and a pH of 8.5. The organic-inorganic composite particles of Example 1.1 contained 58 weight % titanium dioxide, 37.1 weight % polymer particles, and 4.9 weight % of a polymethyl methacrylate polymer layer, based on the weight of the organic-inorganic composite particles; and had an average particle diameter of 444 nm.

Example 1.2

Example 1.2 was prepared by polymerizing a second encapsulating polymer layer to the organic-inorganic composite particles of Example 1.1. To the flask was added 49.62 g of Example 1.1 followed by the addition of 4.94 g methyl methacrylate. Next, a solution of 0.025 g sodium persulfate diluted in 5.72 g of deionized water was added. The contents of the flask was stirred under a nitrogen atmosphere and heated to a temperature of 70° C. The contents of the flask was maintained at 70° C. for 3 hours until the polymerization of the methyl methacrylate was completed.

The resulting aqueous dispersion containing organic-inorganic composite particles, Example 1.2, had a solids level of 41.6 weight % and a pH of 7.6. The organic-inorganic composite particles of Example 1.2 contained 46.3 weight % titanium dioxide, 29.7 weight % polymer particles, and 24 weight % of a polymethyl methacrylate polymer layer, based on the weight of the organic-inorganic composite particles; and had an average particle diameter of 496 nm.

EXAMPLE 2

Example 2.1

Example 2.1 was prepared according to general procedure of Example 1.1. To the flask was added 100 g of Primary Composite Particle Composition B followed by the addition of 2.71 g methyl methacrylate and 30 g deionized water. Next, a solution of 0.0134 g sodium persulfate diluted in 2.5 g of deionized water was added. The jar containing this solution was rinsed with 5 g deionized water and the rinse water was added to the flask. The contents of the flask was stirred under a nitrogen atmosphere and heated to a temperature of 70° C. The contents of the flask was maintained at 70° C. for 4 hours. Next, an initiator solution was added to polymerize unreacted monomer. The resulting aqueous dispersion containing organic-inorganic composite particles, Example 2.1, had a solids level of 38.8 weight % and a pH of 8. The organic-inorganic composite particles of Example 2.1 contained 59.5 weight % titanium dioxide, 35.7 weight % polymer particles, and 4.8 weight % of a polymethyl methacrylate polymer layer, based on the weight of the organic-inorganic composite particles; and had an average particle diameter of 573 nm.

Example 2.2

Example 2.2 was prepared by polymerizing a second encapsulating polymer layer to the organic-inorganic composite particles of Example 2.1. To the flask was added 45.22 g of Example 2.1 followed by the addition of 2.2 g methyl methacrylate and 2.25 g butyl acrylate. The contents of the flask was stirred under a nitrogen atmosphere and heated to a temperature of 70° C. Next, a solution containing 4.39 g of an aqueous 0.5 weight % sodium persulfate solution was added. The contents of the flask was maintained at 70° C. for 4 hours. The resulting aqueous dispersion containing organic-inorganic composite particles, Example 2.2, had a solids level of 41.4 weight % and a pH of 7.6. The organic-inorganic composite particles of Example 2.2 contained 47.4 weight % titanium dioxide, 28.4 weight % polymer particles, and 24.2 weight % of a polymer layer, based on the weight of the organic-inorganic composite particles; and had an average particle diameter of 587 nm. The polymer layer had an average composition containing 42.5 weight % butyl acrylate and 57.5 weight % methyl methacrylate as polymerized units.

EXAMPLE 3

Example 3.1

Example 3.1 was prepared according to general procedure of Example 1.1. To the flask was added 111.8 g of Primary Composite Particle Composition C followed by the addition of 37.69 g deionized water and 3.06 methyl methacrylate. The contents of the flask was stirred under a nitrogen atmosphere and heated to a temperature of 70° C. Next, 3.04 g of a 0.5 weight % aqueous sodium persulfate solution was added. The contents of the flask was maintained at 70° C. for 3 hours. The resulting aqueous dispersion containing organic-inorganic composite particles, Example 3.1, had a solids level of 41.4 weight % and a pH of 9. The organic-inorganic composite particles of Example 3.1 contained 59.6 weight % titanium dioxide, 35.6 weight % polymer particles, and 4.8 weight % of a polymethyl methacrylate polymer layer, based on the weight of the organic-inorganic composite particles; and had an average particle diameter of 694 nm.

Example 3.2

Example 3.2 was prepared by polymerizing a second encapsulating polymer layer to the organic-inorganic composite particles of Example 3.1. To the flask was added 75 g of Example 3.1 followed by the addition of 3.96 g methyl methacrylate and 3.88 g butyl acrylate. The contents of the flask was stirred under a nitrogen atmosphere and heated to a temperature of 70° C. Next, a solution containing 8.08 g of a 0.5 weight % aqueous sodium persulfate solution was added, followed by the addition of 4.19 g deionized water. The contents of the flask was maintained at 70° C. for 7 hours. The resulting aqueous dispersion containing organic-inorganic composite particles, Example 3.2, had a solids level of 40.5 weight % and a pH of 7.5. The organic-inorganic composite particles of Example 3.2 contained 47.5 weight % titanium dioxide, 28.4 weight % polymer particles, and 24.1 weight % of a polymer layer, based on the weight of the organic-inorganic composite particles; and had an average particle diameter of 544 nm. The polymer layer had an average composition containing 41.6 weight % butyl acrylate and 58.4 weight % methyl methacrylate as polymerized units.

The organic-inorganic composite particles of Examples 1.1, 1.2, 2.1, 2.2, 3.1, and 3.2 were prepared in reaction systems containing anionic materials.

EXAMPLE 4

Evaluation of Organic-Inorganic Composite Particles

The organic-inorganic composite particles of Example 1.2 were evaluated as components of dried coatings.

Aqueous coating compositions were prepared containing the organic-inorganic composite particles at several pigment volume concentrations. First, a master composition was prepared containing the ingredients listed in Table 4.1.

TABLE 4.1

| Master Composition #1 | |
|---|---|
| Ingredients | Amount |
| deionized water | 9.79 g |
| Rhoplex ™ AC-261 polymer binder (50 weight % solids) (Rohm and Haas Company) | 65.2 g |
| Texanol ™ coalescent (Eastman Chemical Corp.) | 7.6 g |
| Natrosol ™ 250 MHR thickener ((2.5 weight % in water) (Hercules Corp.) | 16.9 g |
| Supronil ™ HK black dye (Clariant AG Corp.) | 0.51 g |

Next, a clear coating composition having zero PVC was prepared containing the ingredients listed in Table 4.2.

TABLE 4.2

| Clear Coating Composition #1 | |
|---|---|
| Ingredients | Amount |
| deionized water | 24.6 g |
| Rhoplex ™ AC-261 polymer binder (50 weight % solids) (Rohm and Haas Company) | 34.7 g |
| Master Composition #1 | 40.6 g |

An aqueous pigmented composition containing the organic-inorganic composite particles of Example 1.2 and a comparative pigmented composition were prepared at pigment volume concentrations of 12.1% containing the ingredients listed in Table 4.3.

TABLE 4.3

| Aqueous Pigmented Composition and Comparative Pigmented Composition (12.5 PVC) | | |
|---|---|---|
| Ingredients | Aqueous Pigmented Composition | Comparative Pigmented Composition D |
| deionized water | 4.16 g | 20.88 g |
| Rhoplex ™ AC-261 polymer binder (50 weight % solids) (Rohm and Haas Company) | — | 12.55 g |
| Example 1.2 | 62.91 g | — |
| Primary Composite Particle Composition A | — | 33.76 g |

TABLE 4.3-continued

Aqueous Pigmented Composition and Comparative Pigmented Composition (12.5 PVC)

| Ingredients | Aqueous Pigmented Composition | Comparative Pigmented Composition D |
|---|---|---|
| Supronil ™ HK black dye (Clariant AG Corp.) | 0.027 g | 0.024 g |
| Master Composition #1 | 32.91 g | 32.79 g |

Aqueous pigmented compositions were prepared at 4 and 8 PVC by combining the aqueous pigmented composition at 12.1 PVC and the Clear Coating Composition #1. Comparative pigmented compositions were prepared at 4 and 8 PVC by combining the comparative pigmented composition at 12.1 PVC and the Clear Coating Composition #1.

Dried coated samples were prepared by applying the aqueous pigmented compositions, the comparative pigmented compositions, and the Clear Coating Composition #1 onto opacity charts (The Leneta Company, Form 5C) with a drawdown bar. The wet films were prepared at 254 microns (10 mil) and then allowed to dry at 20% relative humidity and 20° C. for 4 hours.

The dried coatings were brushed with ISOPAR™ L fluid (Exxon Mobil Chemical Corp.) to fill the air voids in the dried coatings with a solvent having the same refractive index as the dried polymer binder. This minimized the effect of light scattering by the air voids in the dried film. The reflectance values of the dried coating were measured one minute after the application of the solvent using a Gardner reflectometer (Gardner Laboratories). Scattering by the dried coatings was calculated from the reflectance. The scattering coefficient is commonly expressed in units of reciprocal length, such as S/mil or mil$^{-1}$ (1 mil=25.4 microns). A larger value for the scattering coefficient indicated a higher degree of hiding by the dried coating.

TABLE 4.4

Scattering for Dried Coatings Prepared From Aqueous Pigmented Compositions and Comparative Pigmented Compositions (S/mil)

| PVC | Aqueous Pigmented Composition | Comparative Pigmented Composition D |
|---|---|---|
| 0 | 0 | 0 |
| 4 | 3.08 | 2.73 |
| 8 | 5.65 | 4.88 |
| 12.1 | 8.06 | 6.57 |

The results in Table 4.4 show that the dried coatings containing the organic-inorganic composite particles of Example 1.2 had increased light scattering values compared to the comparative dried coatings containing the primary composite particles. This increase in scattering values resulted from more efficient scattering by the titanium dioxide contained in the dried coating with the organic-inorganic composite particles of this invention compared to titanium dioxide contained in the primary composite particles of the comparative dried coating.

EXAMPLE 5

Evaluation of Organic-Inorganic Composite Particles

The organic-inorganic composite particles of Examples 2.2 and 3.2 were evaluated as components of dried coatings.

Aqueous coating compositions were prepared containing the organic-inorganic composite particles at several pigment volume concentrations. First, a master composition was prepared containing the ingredients listed in Table 5.1.

TABLE 5.1

Master Composition #2

| Ingredients | Amount |
|---|---|
| Rhoplex ™ AC-261 polymer binder (50 weight % solids) (Rohm and Haas Company) | 60.7 g |
| Texanol ™ coalescent (Eastman Chemical Corp.) | 10 g |
| Natrosol ™ 250 MHR thickener ((2.5 weight % in water) (Hercules Corp.) | 28.5 g |
| Supronil ™ HK black dye (Clariant AG Corp.) | 0.86 g |

Next, a clear coating composition having zero PVC was prepared containing the ingredients listed in Table 5.2.

TABLE 5.2

Clear Coating Composition #2

| Ingredients | Amount |
|---|---|
| deionized water | 26.7 g |
| Rhoplex ™ AC-261 polymer binder (50 weight % solids) (Rohm and Haas Company) | 42.5 g |
| Master Composition #1 | 30.8 g |

Aqueous pigmented compositions containing the organic-inorganic composite particles of Example 2.2 and Example 3.2, and comparative pigmented compositions were prepared at pigment volume concentrations of 15% containing the ingredients listed in Table 5.3.

TABLE 5.3

Aqueous Pigmented Composition and Comparative Pigmented Composition (15 PVC)

| Ingredients | Aqueous Pigmented Composition of Example 2.2 | Aqueous Pigmented Composition of Example 3.2 | Comparative Pigmented Composition E | Comparative Pigmented Composition F | Comparative Pigmented Composition G |
|---|---|---|---|---|---|
| Ti-Pure ™ R-746 titanium dioxide | — | — | — | — | 19.05 g |

TABLE 5.3-continued

Aqueous Pigmented Composition and Comparative Pigmented Composition (15 PVC)

| Ingredients | Aqueous Pigmented Composition of Example 2.2 | Aqueous Pigmented Composition of Example 3.2 | Comparative Pigmented Composition E | Comparative Pigmented Composition F | Comparative Pigmented Composition G |
|---|---|---|---|---|---|
| Example 2.2 | 74.6 g | — | — | — | — |
| Example 3.2 | — | 76.33 g | — | — | — |
| Primary Composite Particle Composition B | — | — | 43.58 g | — | — |
| Primary Composite Particle Composition C | — | — | — | 43.09 g | — |
| Rhoplex ™ AC-261 polymer binder | — | — | 14.92 g | 14.95 g | 32.33 g |
| deionized water | 1.77 g | — | 17.89 g | 18.36 g | 25.12 g |
| Supronil ™ HK black dye | 0.041 g | 0.041 g | 0.041 g | 0.041 g | 0.042 g |
| Master Composition #2 | 23.6 g | 23.6 g | 23.6 g | 23.6 g | 23.5 g |

Aqueous pigmented compositions were prepared at 4, 8, and 12 PVC by combining the aqueous pigmented compositions at 15 PVC and the Clear Coating Composition #2. Comparative pigmented compositions were prepared at 4, 8, and 12 PVC by combining the comparative pigmented compositions at 15 PVC and the Clear Coating Composition #2.

TABLE 5.4

Scattering for Dried Coatings Prepared From Aqueous Pigmented Compositions and Comparative Pigmented Compositions (S/mil)

| PVC | Aqueous Pigmented Composition of Example 2.2 | Aqueous Pigmented Composition of Example 3.2 | Comparative Pigmented Composition E | Comparative Pigmented Composition F | Comparative Pigmented Composition G |
|---|---|---|---|---|---|
| 0 | 0 | 0 | 0 | 0 | 0 |
| 4 | 2.06 | 2.10 | 1.96 | 1.91 | 1.81 |
| 8 | 3.67 | 3.94 | 3.43 | 3.27 | 3.04 |
| 12 | 5.13 | 5.49 | 4.72 | 4.54 | 3.85 |

The results in Table 5.4 show that the dried coatings containing the organic-inorganic composite particles of Example 2.2 or Example 3.2 had increased light scattering values compared to the comparative dried coatings. This increase in scattering values resulted from more efficient scattering by the titanium dioxide contained in the organic-inorganic composite particles of this invention compared to titanium dioxide contained in the primary composite particles of the comparative dried coatings prepared from Comparative Compositions E or F. Further, the comparative dried coating prepared from Comparative Composition G, in which the titanium dioxide that is not contained in either a primary composite particle or the organic-inorganic composite particle of this invention, had the lowest values for the scattering coefficient, indicating the least efficient use of the titanium dioxide particles in the comparative dried coatings.

What is claimed is:

1. An organic-inorganic composite particle comprising:
   a) a primary composite particle comprising:
      i) an inorganic particle, and
      ii) a plurality of polymer particles in contact with the surface of said inorganic particle; and
   b) a polymer layer encapsulating said primary composite particle.

2. The organic-inorganic composite particle according to claim 1 wherein said polymer particles have groups selected from phosphorus acid groups, phosphorus acid full-ester groups, polyacid sidechain groups, and mixtures thereof.

3. The organic-inorganic composite particle according to claim 1 wherein said polymer particles are in contact with the surface of said inorganic particle by covalent bonding to said inorganic particle.

4. The organic-inorganic composite particle according to claim 1 wherein the weight ratio of said polymer particles (ii) to said polymer layer (b) is in the range of from 10:1 to 1:10.

5. The organic-inorganic composite particle according to claim 1 having a combined polymer weight of said polymer particles and said polymer layer in the range of from 5 to 90 weight %, based on the weight of said organic-inorganic composite particle.

6. A process for preparing organic-inorganic composite particles, comprising the steps of:

a) providing an aqueous dispersion comprising primary composite particles dispersed in an aqueous medium, wherein each of said primary composite particles comprise: (i) an inorganic particle and (ii) a plurality of polymer particles in contact with the surface of said inorganic particle; and b) polymerizing at least one monomer in the presence of said primary composite particles to form a polymer layer encapsulating said primary composite particles and to provide said organic-inorganic composite particles.

7. The process according to claim 6 wherein said polymer particles have at least one functional group selected from the group consisting of phosphorus acid groups, phosphorus acid full-ester groups, polyacid sidechain groups, and mixtures thereof.

8. The process according to claim 6 wherein said polymer particles are in contact with the surface of said inorganic particle by covalent bonding to said inorganic particle.

9. The process according to claim 6 wherein the weight ratio of said polymer particles (ii) to said polymer layer is in the range of from 10:1 to 1:10.

10. The process according to claim 6 wherein said organic-inorganic composite particle has a combined polymer weight of said polymer particles and said polymer layer in the range of from 5 to 90 weight %, based on the weight of said organic-inorganic composite particle.

* * * * *